United States Patent [19]

Merritt et al.

[11] Patent Number: 5,346,960
[45] Date of Patent: Sep. 13, 1994

[54] FATTY ACID HYDROXYALKYLAMIDES AS COREACTABLE STABILIZERS AND FLOW AIDS FOR POWDER COATINGS

[75] Inventors: Richard F. Merritt, Ft. Washington; Kurt A. Wood, Abington; Aurelia de la Cuesta Sheppard, Newtown, all of Pa.

[73] Assignee: Rohm and Haas Company, Philadelphia, Pa.

[21] Appl. No.: 71,786

[22] Filed: Feb. 22, 1993

Related U.S. Application Data

[62] Division of Ser. No. 920,405, Jul. 27, 1992, Pat. No. 5,216,090.

[51] Int. Cl.$^5$ .................... C08L 33/02; C08L 33/06
[52] U.S. Cl. .................... 525/221; 525/183; 525/227; 525/329.7; 525/418; 525/451; 525/934

[58] Field of Search .................... 525/183, 221, 227

[56] References Cited

U.S. PATENT DOCUMENTS 4,252,967  2/1981  Broering et al. .................... 528/492
5,202,382  4/1993  Pettit, Jr. .................... 525/108

*Primary Examiner*—James J. Seidleck
*Assistant Examiner*—Mary Critharis
*Attorney, Agent, or Firm*—Marvin J. Powell; Sudhir G. Deshmukh

[57] ABSTRACT

A thermosetting powder coating composition having improved optical properties, such as orange peel, gloss and Distinctness of Image (DOI), which includes a reactable mixture of a carboxylic acid group-containing polyester or acrylic, a fatty acid hydroxyalkylamide group-containing material and beta-hydroxyalkylamide curing agent.

7 Claims, No Drawings

5,346,960

FATTY ACID HYDROXYALKYLAMIDES AS COREACTABLE STABILIZERS AND FLOW AIDS FOR POWDER COATINGS

This is a divisional of patent application Ser. No. 07/920,405, filed on Jul. 27, 1992, now the U.S. Pat. No. 5,216,090.

FIELD OF THE INVENTION

This invention relates to thermosetting powder coating compositions and, more particularly, to powder coating compositions having improved optical properties such as reduced orange peel and enhanced Distinctness of Image (DOI). Powder coatings of this invention are suitable for use in general industrial coatings, machinery and equipment coatings, especially metal coatings such as cans, appliances, automobile parts and the like. In addition, the powder coating compositions can be used in films, fibers, paints, lacquers, varnishes, seamless flooring, caulks and impregnants.

BACKGROUND OF THE INVENTION

It is known in the art that powder coating compositions are useful in painting metallic substrates. Such coating compositions are extremely desirable since their use greatly reduces and can even eliminate organic solvents in liquid paints. When powder coating compositions are cured by heating, little, if any, volatile material is given off to the surrounding environment. This is a significant advantage over liquid paints in which the organic solvent is volatilized into the atmosphere when the paint is cured by heating.

For exterior durability, the powder coating composition of the prior art were formulated with a carboxylic acid group-containing polyester or acrylic polymer, a dicarboxylic acid group-containing material and beta-hydroxyalkylamide curing agent. These powder coating compositions and curing systems were said to be stable and possessed good physical properties. It is also equally well known that the curing mechanism of the powder coating is an important aspect of powder coatings compositions. The curing system of this invention offers improved optical properties over prior art systems, while maintaining other desirable physical properties.

The curing mechanism of this invention is based on an acid group-containing polyester or acrylic polymer, a beta-hydroxyalkylamide curing agent and a fatty acid hydroxylalkylamide group-containing material, which unexpectedly improves optical properties, such as peel.

DESCRIPTION OF THE PRIOR ART

U.S. Pat. No. 4,801,680 discloses a thermosetting powder coating composition comprising a difunctional carboxylic acid group containing polyester and a beta-hydroxyalkylamide curing agent.

U.S. Pat. No. 4,889,890 discloses a composition comprising a carboxylic acid group-containing polymer, an epoxy group-containing material having greater than one epoxy group-containing material per molecule and a beta-hydroxyalkylamide.

U.S. Pat. No. 4,417,022 discloses a coating composition indicated to be capable of liquid application to substrates consisting essentially of a curable film-forming polyo-containing component and an organic reactive diluent capable of chemically combining with the curable film forming component.

Japan Patent No. JP01034471 discloses a fast-drying acrylic emulsion coating containing an acrylate ester-based polymer, paraffin wax, and coco fatty acid diethanolamine drying aid which is useful as an automobile felt interior coating.

SUMMARY OF THE INVENTION

In accordance with the present invention, a thermosetting powder coating composition is provided. The composition comprises a carboxylic acid group-containing polyester, a beta-hydroxyalkylamide curing agent and a fatty acid hydroxylalkylamide group-containing material for enhanced optical and appearance properties.

In an alternate embodiment, the powder coating composition can also include a carboxylic acid group-containing polyester, an epoxy functional curing agent such as triglycidyl isocyanurate (TGIC) or mixtures of TGIC and a hydroxyalkylamide curing agent and a fatty acid hydroxylalkylamide group-containing material.

In still a further embodiment, the powder coating composition can include an acid functional acrylic, an epoxy functional curing agent such as triglycidyl isocyanurate (TGIC), or mixtures of TGIC and a hydroxyalkylamide curing agent and a fatty acid hydroxylalkylamide group-containing material.

The powder coating compositions of this invention have improved optical properties such as gloss, orange peel and distinctness of image (DOI).

DETAILED DESCRIPTION OF THE INVENTION

The powder coating compositions of the present invention comprise an intimate mixture of several materials. However, there are three essential ingredients in the powder coating composition of this invention, namely, a carboxylic acid group-containing polyester or acrylic, a betaohydroxyalkylamide curing agent and a fatty acid hydroxyalkylamide material. The addition of the fatty acid hydroxyalkylamide material improves optical properties such as gloss, orange peel and DOI.

Among the carboxylic acid group-containing polyesters which may be used are those based on a condensation reaction of aliphatic polyols, including cycloaliphatic polyols, with aliphatic and/or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylolpropane, and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid, and anhydrides of such acids.

The polyol and the acid or anhydride are reacted together with an excess of acid over alcohol so as to form a polyester which has free carboxylic groups. Preferably, the carboxylic acid group-containing polyester will have an acid number of from about 20 to about 80, more preferably from about 20 to about 50, and will be solid at room temperature. The polyester is further characterized as having a Tg of from about 30° C. to about 85° C., preferably from about 40° C. to about 75° C.

The Tg of a polymer is a measure of the hardness and melt flow of the polymer. The higher the Tg, the less the melt flow and the harder the coating. Tg is described in *Principles of Polymer Chemistry* (1953), Cornell University Press. The Tg can be actually measured or it can be calculated as described by Fox in *Bull. Amer. Physics Soc.*, 1, 3, page 123 (1956). Tg, as used herein, refers to actually measured values. For measurement of the Tg of a polymer, differential scanning calorimetry (DSC) can be used (a rate of heating of 10° C. per minute, with Tg taken at the first influxation point).

If the Tg of the polyester is below 30° C., the polymer and a powder coating composition including such a polymer can tend to be sticky and difficult to handle. If the Tg is above 85° C., the melt flow of the polyester is low and the coating may have poor appearance.

The second essential ingredient in the powder coating compositions of the present invention is beta-hydroxyalkylamide. The beta-hydroxyalkylamide is a curing agent for the acid-functional polyester. The beta-hydroxyalkylamide can help provide a crosslinked polymer network which is hard, durable, corrosion-resistant and solvent-resistant. It is believed the beta-hydroxyalkylamides cure the coating through an esterification reaction with the carboxy-containing polyester to form multiple ester linkages. The hydroxyl functionality of the beta-hydroxyalkylamide should be, on an average basis, at least two, preferably greater than two (2), and more preferably from greater than two (2) up to four (4) in order to obtain optimum curing response.

The beta-hydroxyalkylamide can be prepared by reacting a lower alkyl ester or mixture of esters of carboxylic acids with a beta-hydroxyalkylamide at a temperature ranging from ambient temperature up to about 200° C. depending on the choice of reactants and the presence or absence of a catalyst. Suitable catalysts, include base catalysts such as sodium methoxide, potassium methoxide, sodium butoxide, potassium butoxide, sodium hydroxide, potassium hydroxide and the like, present in amounts of about 0.1 to about 1 percent by weight based on the weight of the alkyl ester.

To bring about the most effective cure of the powder coating composition, the equivalent ratio of beta-hydroxyalkylamide (hydroxy equivalents) to carboxy-containing polyester (carboxylic acid equivalents) is preferably from about 0.6 to 1.6:1, more preferably from 0.8 to 1.3:1. Ratios outside the range of 0.6 to 1.6:1 are undesirable because of poor cure.

The third essential element of the powder coating composition of the present invention is the fatty acid group-containing material. The fatty acid group-containing material is selected from the group consisting of lauramide diethanolamine, acetamide diethanolamine, capramide diethanolamine, stearamide diethanolamine, or other alkanolamine and the like. The fatty acid material is from about 0.1 percent to about 15 percent by weight based on the weight of the polyester resin, preferably from about 2 percent to about 10 percent. The fatty acid material has been found to unexpectedly improve optical properties such as gloss, orange peel and DOI.

In alternate embodiment of the present invention the acid group-containing acrylic polymer is used in place of the polyester polymer. Preferably, the carboxylic acid group-containing acrylic will have an acid number of from about 20 to about 80, more preferably from about 20 to about 50, and will be solid at room temperature. The acrylic is further characterized as having a Tg of from about 35° C. to about 100° C., preferably from about 45° C. to about 70° C. When a carboxylic acid group-containing acrylic polymer is used, the fatty acid material is employed at a concentration of from about 0.1 percent to about 15 percent by weight based on the weight of the acrylic resin, preferably from about 2 percent to about 10 percent. In preparing the acid group-containing acrylic polymer, various monomers are mixed together and are reacted by conventional free radical initiated polymerization processes. Among the free radical initiators which may be used are benzoyl peroxide, tertiarybutyl hydroperoxide, ditertiarybutyl peroxide, azobis(2methylpropionitrile) and so forth. Chain transfer agents such as mercaptopropionic acid can also be used.

The carboxylic acid group-containing acrylic polymer can be formed by reacting a polymerizable alpha, beta-ethylenically unsaturated carboxylic acid with one or more other polymerizable alpha, beta-ethylenically unsaturated monomers, e.g., esters of alpha, beta-ethylenically unsaturated carboxylic acids and, optionally, vinyl aromatic monomers.

Examples of the carboxylic acid group-containing monomers which can be used are acrylic acid and methacrylic acid, which are preferred, as well as crotonic acid, iraconic acid, fumaric acid, maleic acid, citraconic acid and the like, as well as mono alkyl esters of unsaturated dicarboxylic acids. The acid group-containing monomer is preferably present in the polymer in amounts from about 6 to about 25 percent by weight, more preferably from about 8 to about 18 percent by weight, most preferably from about 10 to about 14 percent by weight based on the total weight of the monomers. Amounts less than about six percent by weight may result in poor solvent resistance and poor mechanical strength in the coating.

Esters of alpha, beta-ethylenically unsaturated carboxylic acids are also used in forming the acrylic polymer. Preferably, such esters are $C_1$ to $C_{20}$ alkyl esters of acrylic acid or methacrylic acid and include methyl acrylate, ethyl acrylate, butyl acrylate, 2-ethylhexyl acrylate, dodecyl acrylate, methyl methacrylate, ethyl methacrylate, butyl methacrylate, 2-ethylhexyl methacrylate and the like. Preferably, these esters are present in amounts of about 5 to 70, more preferably from about 10 to 50 percent by weight based on the total weight of the monomers. More preferably, the esters of the alpha, beta-ethylenically unsaturated acids are a mixture of $C_1$ to $C_2$ alkyl esters and $C_4$ to $C_{20}$ alkyl esters, such as a mixture of methyl methacrylate and butyl methacrylate.

Examples of vinyl aromatic compounds are monofunctional vinyl aromatic compounds, such as styrene, which is preferred, and alkyl-substituted styrenes, such as alpha-methyl styrene, and substituted styrene such as chlorostyrene. The vinyl aromatic monomer can be present in the composition in amounts from 0 to about 94 percent by weight, preferably from about 35 to about 70 percent by weight based on the total weight of the monomers. Higher amounts of a vinyl aromatic monomer may result in lower UV resistance whereas lower amounts may result in poorer detergent resistance.

In addition to the esters of alpha, beta-ethylenically unsaturated acids and the optional vinyl aromatic compounds, other ethylenically unsaturated copolymerizable monomers may be used. Examples include nitriles, such as acrylonitrile, vinyl halides and vinylidene halides, such as vinyl chloride and vinylidene chloride, and vinyl esters such as vinyl acetate. These additional monomers can be present in amounts of from 0 to about 40 percent by weight, preferably from 0 to about 30 percent by weight based on the total weight of monomers.

The polymerization is preferably carried out in solution using a solvent in which the monomers are soluble such as toluene or xylene. At the completion of the polymerization, the reaction mixture is devolatized such as by placing it under vacuum to remove the organic solvent and recovering the polymer as a solid material. Alternately, the polymer can be precipitated and subsequently dried. Usually the devolatized polymer will contain less than 1 percent by weight of materials that volatize at the temperatures used for curing the coatings.

The acid group-containing polymer can also be an acrylic polymer prepared by emulsion polymerization, suspension polymerization, bulk polymerization or suitable combinations thereof as outlined in U.S. Pat. No. 4,727,111 and is, by this reference, incorporated herein. These techniques are well-known in the art. The beta-hydroxyalkylamide materials can be depicted structurally as follows:

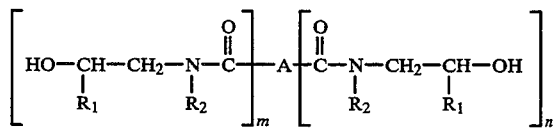

wherein
$R_1$ is H or $C_1$-$C_5$ alkyl;
$R_2$ is H, $C_1$-$C_5$ alkyl or

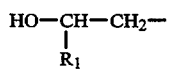

wherein $R_1$ is as described above; A is a bond, monovalent or polyvalent organic radical derived from a saturated, unsaturated or aromatic hydrocarbon including substituted hydrocarbon radicals containing from 2 to 20 carbon atoms, m is equal to 1 to 2, n is equal to 0 or 2, and m+n is at least 2, preferably greater than 2, usually within the range of from 2 up to and including 4. Preferably, A is an alkylene radical—$(CH_2)$ x—where x is from 2 to 12, preferably from 4 to 10.

The powder coating composition can further include a polycarboxylic acid group-containing material selected from the group of $C_4$-$C_{20}$ aliphatic polycarboxylic acids, polymeric polyanhydrides, low molecular weight polyesters having an acid equivalent weight from about 150 to about 600 and mixtures thereof.

Among the aliphatic polycarboxylic acids which may be used are included dicarboxylic acids such as adipic acid, suberic acid, azelaic acid, sebacic acid and dodecanedioic acid. Preferably, the aliphatic dicarboxylic acid contains an even number of carbons.

The coating composition may also contain certain other additives that are typically incorporated into powder coating compositions such as pigments, flow control agents, anti-popping agents, powder flow additives and light stabilizers.

In order to give the powder coating compositions a suitable color, a pigment can be included in the coating composition typically in amounts from about 1 to about 50 percent by weight, based on the total weight of the powder coating composition. Pigments which are suitable for powder coating compositions may be organic or inorganic and include basic lead silica chromate, titanium dioxide, ultramarine blue, phthalocyanine blue, phthalocyanine green, carbon black, black iron oxide, chromium green oxide, ferrite yellow and quinto red.

Suitable as flow control agents are acrylic polymers or copolymers such as polylauryl acrylate, polybutyl acrylate, poly(2-ethylhexyl) acrylate, poly(ethyl acrylate-co-2-ethylhexyl acrylate), polylauryl methacrylate, polyisodecylmethacrylate and the like, and fluorinated polymers such as esters of polyethylene glycol or polypropylene glycol with fluorinated fatty acids, e.g., an ester of polyethylene glycol having a molecular weight over about 2,500 and perfluo octanoic acid. Polymeric siloxanes with molecular weights over 1,000 may also be used as a flow control agent, for example, polydimethylsiloxane or poly(methylphenyl) siloxane. The flow control agents can aid in reduction of surface tension during heating of the powder and in eliminating crater formation. Generally, the flow control agent, when used, is present in amounts from about 0.05 to about 5 percent by weight based on the total weight of the powder coating composition.

Anti-popping agents can be added to the compositions to allow any volatile material present to escape from the film during baking. Benzoin is a highly preferred degassing agent and when used is present in amounts ranging from about 0.5 to about 3 percent by weight based on total weight of the powder coating composition. The powder coating compositions may also preferably contain UV absorbing agents, such as TINUVIN ®, which is commercially available and a registered trademark of Ciba-Geigy Company. When used, TINUVIN ® are typically present in the compositions in amounts of about 0.5 to about 6 percent by weight based on the total weight of the powder coating composition.

In addition, the powder coating composition may contain fumed silica or the like as a powder flow additive to reduce caking of the powder during storage. An example of fumed silica is sold by Cabot Corporation under the trademark CAB-O-SIL ®. The powder flow additive, when used, is generally present in amounts ranging from about 0.1 to about 0.5 percent by weight based on the total weight of the powder coating composition. The powder flow additive is generally added to the particulate powder coating composition after preparation of the particulate mixture.

The thermosetting powder coating compositions are prepared by melt blending the ingredients of the coating composition. This can be accomplished by first blending in a high shear or high-intensity dry mixer, e.g., a Henscheil mixer, and then melt blending the mixture in an extruder, for example, a Werner-Pfieiderer ZK-30 twin screw extruder at a temperature from about 80° C. to about 130° C.. The extrudate is then cooled and pulverized into a powder. The powder coating composition can be applied directly to metal such as steel or aluminum, glass, plastic, or fiber-reinforced plastic substrates.

Application of the powder can be by electrostatic (corona discharge or triboelectric) spraying or by the use of a fluidized bed. Electrostatic spraying is preferred. The powder coating composition can be applied in one pass or in several passes to provide a film thickness after cure of about 0.5 to about 5 mils. Preferably, to provide a high-quality finish at reasonable cost, the thickness of the powder coating is from about 1.2 to about 4 mils, preferably from about 1.4 to about 3 mils.

The substrate to be coated can optionally be preheated prior to application of the powder to promote a more uniform powder deposition. Upon application of the powder, the powder-coated substrate can be baked typically at from about 300° F. to about 400° F. (149° C. to 204° C.) for about 5 to about 60 minutes, preferably about 20 to about 40 minutes.

The following examples show the preparation of various hydroxyalkylamide curing agents, carboxylic acid-functional polyester polymers, carboxylic acid-functional acrylic polymers, treated with fatty acids hydroxyalkylamide which are used in preparing thermosetting powder coating compositions of this invention to unexpectedly improve gloss, orange peel and DOI.

The following examples are intended to be illustrative of this inventive concept of the invention but do not in any way limit its scope or interpretation which is more clearly defined in the appended claims.

EXAMPLE 1

PREPARATION OF A POLYESTER POWDER COATING

WHITE PIGMENTED

A pigmented powder coating composition containing a beta-hydroxyalkylamide crosslinker, a carboxylic acid containing polyester and various levels of a fatty acid hydroxyalkylamide. For comparison, a similar system without the fatty acid hydroxyalkylamide is given. All values are percents of the total formulation

| Ingredient | Sample A | B | C | D |
|---|---|---|---|---|
| Carboxylic acid group containing polyester[1] | 55.81 | 55.83 | 55.37 | 54.24 |
| Hydroxyalkylamide | 2.94 | 2.30 | 1.66 | — |
| Modaflow III[2] | 0.75 | 0.76 | 0.76 | 0.76 |
| Lauramide Diethanolamine (fatty acid hydroxyalkylamide) | — | 1.12 | 2.21 | 5.00 |
| Benzoin | 0.50 | 0.49 | 0.50 | 0.50 |
| Titanium Dioxide | 40.00 | 39.50 | 39.50 | 39.50 |

Notes
[1] A polyester having an acid number of ca. 34 available as Grilesta V76-12 from EMS-American Grilon.
[2] Modaflow III is an acrylic copolymer on a silica support and is available from Monsanto Company.

The formulation ingredients were premixed in a Henschel high-intensity mixer at 1,800 rpm for one (1) minute followed by extrusion in an Werner and Pfleiderer ZSK-30 extruder at 110° C. The extrudates were then cooled, crushed, milled in a Mikropul hammermill, sieved through a 140 mesh screen, and electrostatically sprayed onto Bonderite 1000 substrates with a Voltstatic gun. Curing of the powder coatings was carried out in a forced-air oven at 180° C. for 20 minutes. The mechanical and optical properties of these coatings are given in Table 1.

TABLE 1

| Sample | % Fatty Acid[1] Hydroxyalkylamide | Gloss 20/60 | DOI[2] | Orange Peel[3] |
|---|---|---|---|---|
| A (control) | 0 | 70/92 | 40 | 4 |
| B | 2 | 78/91 | 30 | 6 |
| C | 4 | 81/93 | 60 | 5–6 |
| d | 100 | 87.94 | 70 | 7–8 |

Samples containing fatty acid hydroxyalkylamide showed improved gloss, DOI and orange peel.

[1] Percent is based on polyester resin.
[2] DOI scale is 0-100 with 100 = best.
[3] Orange peel scale is 0-10 with 10 = best.

EXAMPLE 2

PREPARATION OF A POLYESTER POWDER COATING

WHITE PIGMENTED

A pigmented powder coating composition containing a beta-hydroxyalkylamide crosslinker, a carboxylic acid containing polyester and an alternate fatty acid hydroxyalkylamide. For comparison, a similar system without the fatty acid hydroxyalkylamide is given. All values are percents of the total formulation.

| Ingredient | Sample A | B |
|---|---|---|
| Carboxylic acid group containing polyester[1] | 55.81 | 56.15 |
| Hydroxyalkylamide | 2.94 | 1.41 |
| Modaflow III[2] | 0.75 | 0.76 |
| Acetamide Diethanolamine (fatty acid hydroxyalkylamide) | — | 1.68 |
| Benzoin | 0.50 | 0.50 |
| Titanium Dioxide | 40.00 | 39.49 |

Notes
[1] A polyester having an acid number of ca. 34 available as Grilesta V76-12 from EMS-American Grilon.
[2] Modaflow III is an acrylic copolymer on a silica support and is available from Monsanto Company.

The formulation ingredients were premixed in a Henschel high-intensity mixer at 1,800 rpm for one (1) minute followed by extrusion in an Werner and Pfleiderer ZSK-30 extruder at 110° C. The extrudates were then cooled, crushed, milled in a Mikropul hammermill, sieved through a 140 mesh screen, and electrostatically sprayed onto Bonderite 1000 substrates with a Voltstatic gun. Curing of the powder coatings was carried out in a forced-air oven at 180° C. for 20 minutes. The mechanical and optical properties of these coatings are given in Table 2.

TABLE 2

| Sample | % Fatty Acid[1] Hydroxyalkylamide | Gloss 20/60 | DOI[2] | Orange Peel[3] |
|---|---|---|---|---|
| A (control) | 0 | 70/92 | 40 | 4 |
| B | 3 | 72/91 | 60 | 4–5 |

Samples containing fatty acid hydroxyalkylamide showed improved DOI and orange peel.

[1] Percent is based on polyester resin.
[2] DOI scale is 0-100 with 100 = best.
[3] Orange peel scale is 0-10 with 10 = best.

EXAMPLE 3

PREPARATION OF A POLYESTER POWDER COATING

WHITE PIGMENTED

A white pigmented powder coating composition containing a beta-hydroxyalkylamide crosslinker, a carboxylic acid containing polyester and an alternate fatty acid hydroxyalkylamide. For comparison, a similar system without the fatty acid hydroxyalkylamide is given. All values are percents of the total formulation.

| Ingredient | Sample A | Sample B |
|---|---|---|
| Carboxylic acid group containing polyester[1] | 55.81 | 55.36 |
| Hydroxyalkylamide | 2.94 | 2.22 |
| Modaflow III[2] | 0.75 | 0.76 |
| Stearamide Diethanolamine (fatty acid hydroxyalkylamide) | — | 1.66 |
| Benzoin | 0.50 | 0.50 |
| Titanium Dioxide | 40.00 | 39.50 |

Notes
[1]A polyester having an acid number of ca. 34 available as Grilesta V76-12 from EMS-American Grilon.
[2]Modaflow III is an acrylic copolymer on a silica support and is available from Monsanto Company.

The formulation ingredients were premixed in a Henschel high-intensity mixer at 1,800 rmp for one (1) minute followed by extrusion in an Werner and Pfleiderer ZSK-30 extruder at 110° C. The extrudates were then cooled, crushed, milled in a Mikropul hammermill, sieved through a 140 mesh screen, and electrostatically sprayed onto Bonderite 1000 substrates with a Voltstatic gun. Curing of the powder coatings was carried out in a forced-air oven at 180° C. for 20 minutes. The mechanical and optical properties of these coatings are given in Table 3.

TABLE 3

| Sample | % Fatty Acid[1] Hydroxyalkylamide | Gloss 20/60 | DOI[2] | Orange Peel[3] |
|---|---|---|---|---|
| A (control) | 0 | 70/92 | 40 | 4 |
| B | 3 | 75/92 | 40 | 5.5 |

Samples containing fatty acid hydroxyalkylamide showed improved DOI and orange peel.

[1]Percent is based on polyester resin.
[2]DOI scale is 0–100 with 100 = best.
[3]Orange peel scale is 0–10 with 10 = best.

EXAMPLE 4

PREPARATION OF A POLYESTER POWDER COATING

A pigmented powder coating composition containing a beta-hydroxyalkylamide crosslinker, a carboxylic acid containing polyester typically used for epoxy/polyester hybrid systems, and/or a fatty acid hydroxyalkylamide. For comparison, a similar system without the fatty acid hydroxyalkylamide is given. All values are percents of the total formulation.

| Ingredient | Sample A | Sample B | Sample C |
|---|---|---|---|
| Carboxylic acid group containing polyester[1] | 54.75 | 54.75 | 52.09 |
| Hydroxyalkylamide | 4.39 | 3.06 | — |
| Modaflow III[2] | 0.75 | 0.75 | 0.75 |
| Lauramide Diethanolamine (fatty acid hydroxyalkylamide) | — | 1.64 | 6.66 |
| Benzoin | 0.50 | 0.50 | 0.50 |
| Titanium Dioxide | 40.00 | 40.00 | 40.00 |

Notes
[1]A polyester having an acid number of ca. 50 and available as Crylcoat 2680 from UCB Chemical.
[2]Modaflow III is an acrylic copolymer on a silica support and is available from Monsanto Company.

The formulation ingredients were premixed in a Henschel high-intensity mixer at 1,800 rmp for 1 minute followed by extrusion in an Werner and Pfleiderer ZSK-30 extruder at 110° C. The extrudates were then cooled, crushed, milled in a Mikropul hammermill, sieved through a 140 mesh screen, and electrostatically sprayed onto Bonderite 1000 substrates with a Voltstatic gun. Curing of the powder coatings was carried out in a forced-air oven at 180° C. for 20 minutes. The mechanical and optical properties of these coatings are given in Table 4.

TABLE 4

| Sample | 20% Gloss | 60% Gloss | DOI | Orange Peel |
|---|---|---|---|---|
| A (control) | 56 | 84 | 30 | 4 |
| B | 64 | 84 | 45 | 5 |
| C[1] | — | — | — | — |

Samples containing fatty acid hydroxyalkylamide showed improved gloss, DOI and orange peel.

Note:
[1]Sample C could not be electrostatically sprayed due to extensive sintering (blocking) of the power upon standing at room temperature after sieving and grinding.

EXAMPLE 5

PREPARATION OF AN ACRYLIC POWDER COATING

A pigmented powder coating composition containing a beta-hydroxyalkylamide crosslinker, a carboxylic acid containing acrylic polymer and a hydroxyalkylamide. For comparison, a similar system without the fatty acid hydroxyalkylamide is given. All values are percents of the total formulation.

| Ingredient | Sample A | Sample B |
|---|---|---|
| Carboxylic acid group containing acrylic resin | 53.49 | 51.48 |
| Hydroxyalkylamide | 5.85 | 2.80 |
| Flow Aid | 0.60 | 0.56 |
| Lauramide Diethanolamine (fatty acid hydroxyalkylamide) | — | 4.93 |
| Benzoin | 0.49 | 0.47 |
| Titanium Dioxide | 39.56 | 39.77 |

TABLE 5

| Sample | 20% Gloss | 60% Gloss | DOI | Orange Peel |
|---|---|---|---|---|
| A (control) | 57 | 90 | 20 | 2.5 |
| B | 68 | 89 | 40 | 5 |

Samples containing fatty acid hydroxyalkylamide showed improved gloss, DOI and orange peel.

TEST PROCEDURES (1) The 20° and 60° gloss were measured with gloss meters manufactured by the Gardner Instrument Company.

(2) Orange Peel is a qualititative measurement of the surface smoothness of cured panels. The orange peel was judged visually and was ranked according to the degree of surface roughness present. The orange peel of individual panels is compared to a control paint that is void of fatty acid hydroxyalkylamide. A rating of 10 is equivalent to the smoothest surface, while a rating of zero (0) is equivalent to the roughest surface.

(3) Distinctness of Image (DOI) was measured using an apparatus manufactured by Gardner Instrument Company. The apparatus reflects semicircle images of varying size on a panel's surface. Each semicircle image has a numerical value associated with it. The size of the images clearly visible on the panel determines the DOI value cited. A rating of 100 is equivalent to the most distinct image, while a rating of zero (0) is equivalent to the least distinct image. In each instance, the DOI is compared to a control panel that is void of fatty acid hydroxyalkylamide.

Although the present invention has been described with specific reference to specific details outlined in the above examples, it is not intended that such details should be regarded as limitations upon the scope of the invention except to the extent that such limitations are included in the accompanying claims.

We claim:

1. A thermosetting powder coating composition having improved optical properties comprising a carboxylic acid group-containing acrylic, a beta-hydroxyalkylamide curing agent, and about 0.1 percent to about 15 percent of a fatty acid hydroxyalkylamide group-containing material selected from the group consisting of lauramide diethanolamine, acetamide diethanolamine, capramide diethanolamine and stearamide diethanolamine.

2. The composition of claim 1 wherein the fatty acid hydroxyalkylamide group-containing material varies from about 2 percent to about 10 percent, based on the weight of the carboxylic acid group-containing acrylic.

3. The composition of claim 2 wherein the fatty acid hydroxyalkylamide group-containing material is lauramide diethanolamine.

4. The composition of claim 2 wherein the fatty acid hydroxyalkylamide group-containing material is acetamide diethanolamine.

5. The composition of claim 2 wherein the fatty acid hydroxyalkylamide group-containing material is stearamide diethanolamine.

6. The composition of claim 2 wherein the carboxylic acid group-containing acrylic has a Tg of from about 35° C. to about 100° C.

7. A thermosetting powder coating composition having improved appearance properties comprising a co-reactable mixture of a carboxylic acid group-containing acrylic, a beta-hydroxyalkylamide curing agent, and from about 0.1 percent to about 15 weight percent by weight based on the weight of the acrylic, of a fatty acid hydroxylalkylamide group-containing material selected from the group consisting of lauramide diethanolamine, acetamide diethanolamine, capramide diethanolamine and stearamide diethanolamine.

* * * * *